April 26, 1949.  W. B. McLENDON  2,468,220
SELF-LOADING DUMP TRUCK
Filed Jan. 8, 1947  3 Sheets-Sheet 1
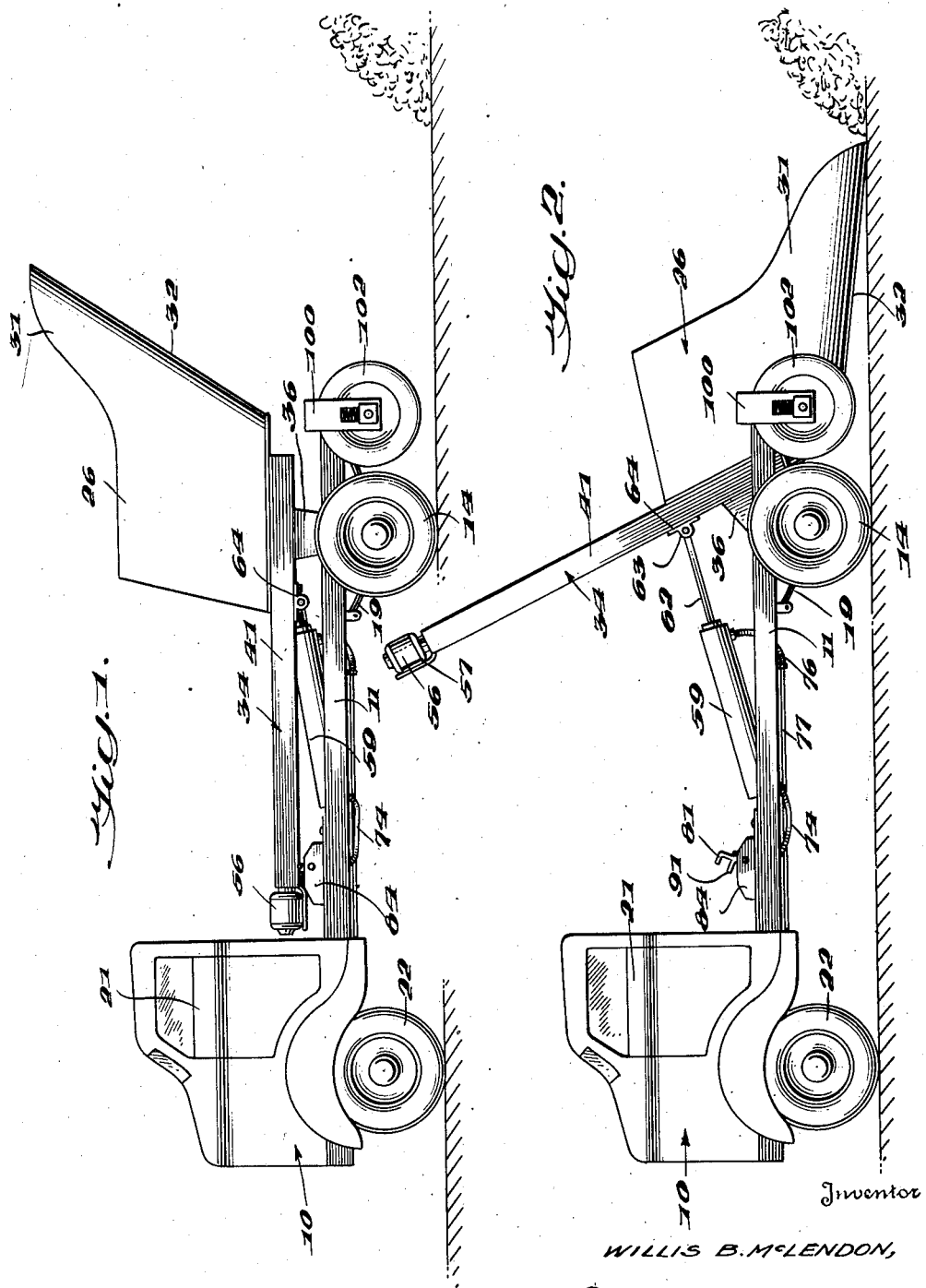
Inventor
WILLIS B. McLENDON,
By Lloyd P. Shank
Attorney

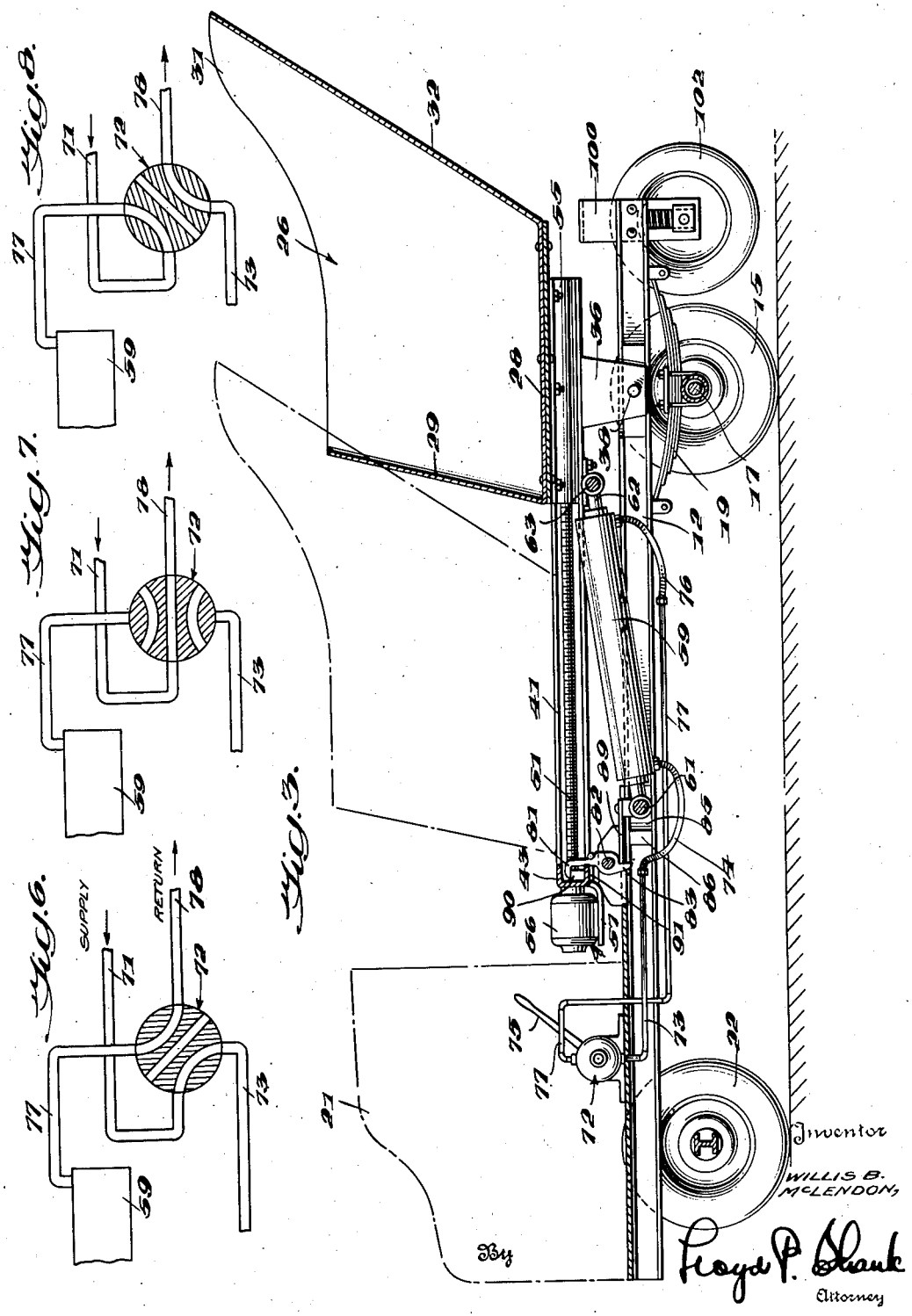

April 26, 1949.  W. B. McLENDON  2,468,220
SELF-LOADING DUMP TRUCK
Filed Jan. 8, 1947  3 Sheets-Sheet 3
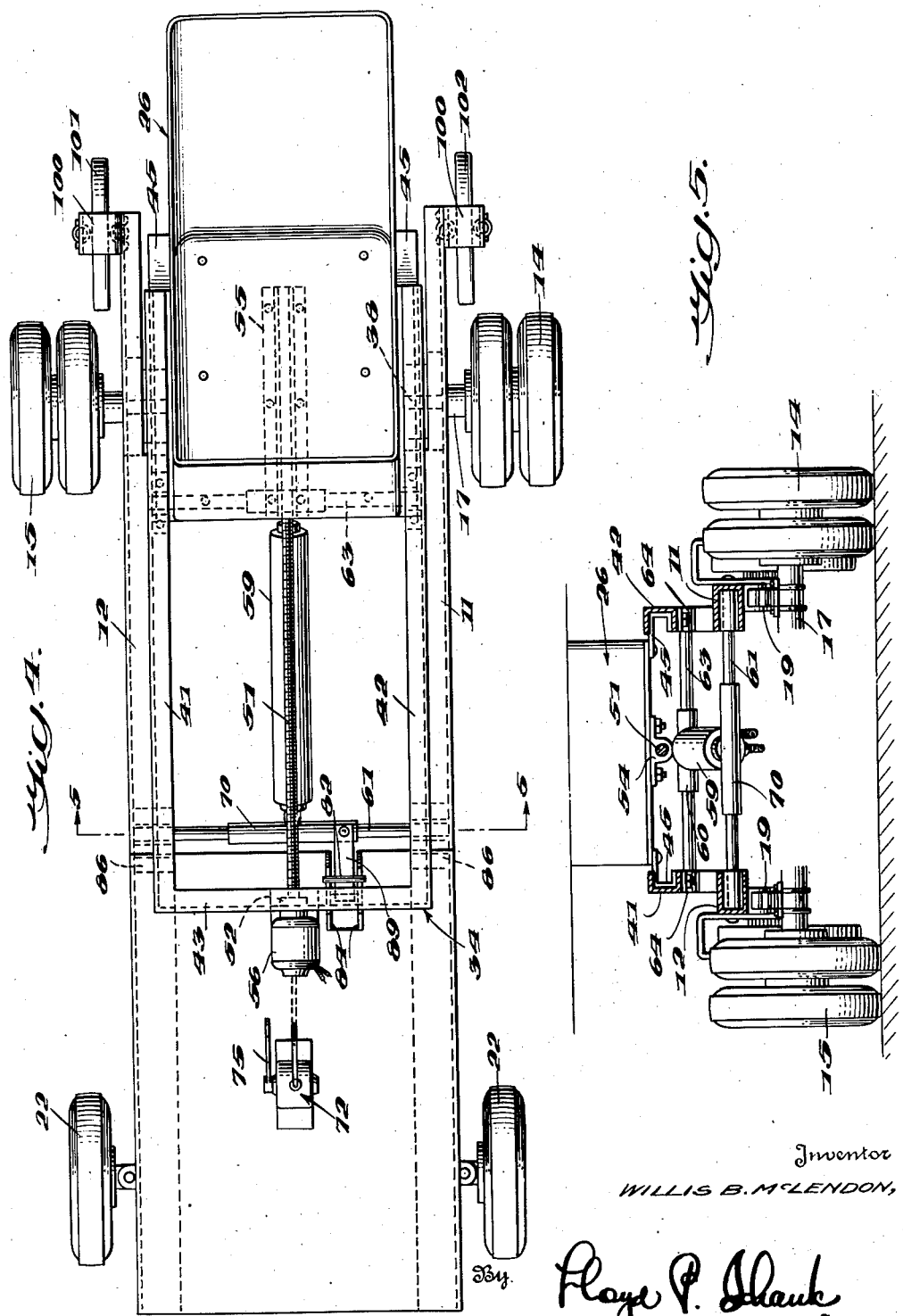
Inventor
WILLIS B. McLENDON, Patented Apr. 26, 1949

2,468,220

UNITED STATES PATENT OFFICE 2,468,220

SELF-LOADING DUMP TRUCK

Willis B. McLendon, Pensacola, Fla.

Application January 8, 1947, Serial No. 720,751

10 Claims. (Cl. 214—78)

The present invention relates to land vehicles and more specifically pertains to a truck of the type adapted to be self-loading for picking up granular material whereby the load may be conveyed by the truck and dumped therefrom.

An object of the present invention is to provide a truck wherein the hopper or body may be moved from a normal position on the vehicle chassis downwardly to a position for permitting material quantities of materials such as earth, coal, sand, and the like to be moved into the hopper or body by the expedient of backing the truck into the material to be loaded thereon.

A more specific object of the invention is to provide a self-loading truck wherein the load-carrying body is mounted for longitudinal movement on an auxiliary frame which is pivotally mounted on the vehicle chassis frame to permit movement of the body to loading positions and to facilitate the lifting of the hopper with the load therein to a position for supporting the load on the vehicle chassis.

Another object of the invention relates to a truck of the self-loading and dump type wherein the body or hopper is mounted for longitudinal movement relative to a U-shaped auxiliary frame including means for moving the hopper longitudinally of the auxiliary frame and means for swinging the U-shaped frame to permit self-loading of the hopper and dumping of the load therefrom.

A further object of the invention is to provide means at the rear end of the truck for preventing tilting of the vehicle chassis during initial lifting of the loaded or partially loaded hopper.

Another object of the invention is to provide novel means for locking the auxiliary frame in a normal or load-carrying position and for automatically unlocking the frame for swinging movement upon initial actuation of the frame toward a loading or unloading position.

Other objects and features of the invention will be more apparent as the present disclosure proceeds and upon consideration of the accompanying drawings and the following detailed description wherein an exemplary embodiment of the invention is disclosed.

In the drawings:

Fig. 1 is a side elevational view of a self-loading dump truck embodying the invention;

Fig. 2 is a similar view showing the body or hopper in the loading position;

Fig. 3 is a longitudinal sectional view of the truck;

Fig. 4 is a plan view of the truck;

Fig. 5 is a transverse sectional view taken on the line 5—5 of Fig. 4;

Fig. 6 is a diagrammatic view illustrating one position of the hydraulic control valve;

Fig. 7 is a similar diagrammatic view illustrating the manner in which the piston of the hydraulic cylinder may be locked in any position; and Fig. 8 is another diagrammatic view showing the hydraulic control valve in another operative position.

The present invention is directed to a self-loading dump truck which has been found to be of practical commercial worth and pertains to a mechanism for shifting the load-carrying body or hopper in a simple and reliable manner including a minimum of parts. The body actuating mechanism includes a U-shaped auxiliary frame pivotally mounted on the chassis frame of the vehicle and adapted to be swung to various positions through an angle of approximately 100° relative to the truck frame by any suitable means such as a hydraulic operated piston and cylinder arrangement. Another feature of the invention pertains to the longitudinal movement of the uniquely shaped body or hopper relative to the U-shaped auxiliary frame so as to permit self-loading of the hopper by the simple expedient of backing the truck into a mass of granular material. The invention further includes automatic means for locking the U-shaped auxiliary frame in a horizontal or load-carrying position and for unlocking this frame during the initial movement thereof to an elevated position. The invention also includes means for avoiding any possibility of the truck chassis turning or tipping about the rear axle during the lifting of the loaded hopper.

Referring to the drawings, there is shown at 10 a land vehicle which may be motor driven. The vehicle chassis includes a frame having longitudinally extending side beams 11 and 12. These side beams of the chassis frame are preferably of channel shape in cross section as shown in Fig. 5. It will be observed that the side beams 11 and 12 extend rearwardly beyond the power driven rear wheels 14 and 15 to provide a rigid portion of the truck chassis frame therebeyond and the purpose thereof will be more apparent as the present disclosure proceeds. Power may be supplied to the driving wheels 14 and 15 in any suitable manner and it is to be noted that the truck chassis frame rearwardly of the axle 17 is unobstructed by any cross members so as to permit the rear end of an auxiliary frame hereinafter described and the load-carrying body or hopper to swing downwardly into the space between the rear ends of the chassis beams 11 and 12 as shown in Fig. 2. The truck body may include conventional type load-carrying springs 19 and the truck also is provided with an enclosed compartment for an operator, and this structure may be of the cab-over-engine type as shown at 21. The truck also includes front wheels represented at 22 which are provided for steering and supporting the front end of the vehicle.

The load-carrying body or hopper 26 is uniquely shaped and includes a bottom wall 28 and a front wall 29. The side walls of the hopper are preferably parallel and extend upwardly as indicated at 31 to provide a relatively long and angularly arranged rear wall 32. This rear wall is preferably arranged at an angle of approximately one hundred and twenty-five degrees with reference to the bottom wall 28. The purpose of angularly arranged rear wall 32 is to permit the hopper to be lowered to a position somewhat as illustrated in Fig. 2 so that the rear wall 32 is then substantially parallel with the ground and to permit the scoop-shaped end to be pushed into a pile of material whereby this material will be introduced into the hopper.

The hopper 26 is mounted for movement on an auxiliary frame 34. This auxiliary frame is pivotally mounted on the vehicle chassis frame and over the rear axle 17 or even forwardly thereof. In the embodiment illustrated the auxiliary frame 34 includes a depending bracket 36 at each side thereof. These brackets 36 may be welded or otherwise secured to the auxiliary frame and stub shafts 38 extend through the brackets 36 and provide a hinge mounting of the auxiliary frame on the chassis frame. The stub shafts 38 are journaled in suitable bearings carried by the beams 11 and 12 of the chassis frame.

The auxiliary frame 34 is U-shaped in plan outline and includes longitudinally extending legs 41 and 42. These legs 41 and 42 are joined at the forward end by means of a head or cross member 43 which may be welded or otherwise secured to the leg members 41 and 42. The auxiliary frame thereby provided is rigid and is adapted to turn about the axis of the stub shafts 38. The auxiliary frame 34 may be moved to a substantially horizontal position as shown in Fig. 1 or moved upwardly through a large angle and even beyond the position shown in Fig. 2.

The load-carrying body or hopper 26 is adapted to be longitudinally moved on the auxiliary frame 34 and any suitable anti-friction means may be provided for permitting the hopper to be readily moved on legs 41 and 42 of the auxiliary frame 34 even when a relatively large load is carried by the hopper. In the embodiment illustrated in the drawings, anti-friction rollers have been avoided for more clearly illustrating the general organization. The U-shaped auxiliary frame and particularly the longitudinally extending legs 41 and 42 are each U-shaped in cross section as shown in Fig. 5 and these frame portions provide means for guiding the hopper as it moves longitudinally of the truck. In the illustrated embodiment shoe members 45 are slidable in the legs 41 and 42 and these members support the hopper or body 26. Other types of anti-friction members may be mounted on the load-carrying body or hopper for sliding or rolling movement in the channel shaped legs 41 and 42 of the auxiliary U-shaped frame 34.

The invention includes means for shifting the hopper 26 longitudinally of the auxiliary frame and in one embodiment of the invention such means includes a worm 51 which extends lengthwise of the U-shaped frame and is journaled in a bearing 52 mounted on the cross member 43. This bearing 52 is of a type to resist longitudinal thrust of the worm 51 in both axial directions thereof. The worm shaft is rotatable in the bearing 52. The free end of the worm 51 is threaded in a nut member 54 rigidly secured to the bottom of the body or hopper 26. A tubular protective sheath 55 may be secured to the under face of the hopper for preventing dirt and the like from engaging threads of the worm 51. The worm passes freely through this tubular member 55. Thus rotation of the worm will cause the hopper 26 to be moved longitudinally of the auxiliary frame. Any suitable means may be employed for driving the worm 51 such as an electric motor 56 rigidly mounted at the forward end of the U-shaped auxiliary frame in any suitable manner, such as by means of a bracket 57. The motor 56 is of a reversible type which may be selectively energized to rotate the worm 51 in either direction and accordingly move the hopper 26 rearwardly or forwardly in accordance with the desires of the operator. The electrical controls for the motor 56 may be of a conventional type and actuated by the driver of the vehicle seated in the cab 21.

The auxiliary frame 34 may be turned about the axis of the stub shafts 38 by a hydraulically operated mechanism which includes a cylinder 59. This cylinder is mounted at its forward end for pivotal movement by means of a transverse shaft 61. This shaft is connected to the end of the cylinder by means of a T-shaped member 70. The member 70 may be welded to the head of the cylinder 59 and rotate on the shaft 61. The hydraulic cylinder assembly includes a piston (not shown) within the cylinder 59 and a piston rod 62 which is connected to an auxiliary frame by means of a transverse rod or shaft 63. This rod 63 may be journaled for rotation in bearings 64, one of which is attached to each of the leg members 41 and 43. The piston rod 62 is connected to the shaft 63 in any appropriate manner. In one construction a T-shaped sleeve 60 is employed to join these members. The sleeve may be welded to the piston rod 62 and rotatably embrace the rod 63. In any eventual construction the cylinder and the piston rod 62 are free to swing when the piston rod 62 moves out of the cylinder 59 as shown in Fig. 2.

A conventional source of liquid under pressure is supplied through a pipe 71 to a control valve shown generally at 72 and mounted adjacent the seat in the cab 21. This control valve includes a handle 75 which, in the position shown in Fig. 3, arranges the valve in the position shown in Fig. 6 whereby liquid under pressure passes from the supply pipe 71 to a conduit 73, a flexible hose 74 and into the forward end of the hydraulic cylinder 59. The piston therein moves rearwardly of the cylinder 59 and the piston rod 62 accordingly is extended so as to move the auxiliary frame 34 upwardly from the position shown in Figs. 1 and 3 to and even beyond the position shown in Fig. 2. During this movement, liquid in the cylinder 59 rearwardly of the piston exhausts through a hose 76 and a pipe 77 and passes through the control valve and into the return conduit 78 and to the source of fluid under pressure.

The U-shaped frame may be locked in any position by turning the control handle 75 to the neutral position so as to move the valve 72 to a position as illustrated in Fig. 7. The supply pipe 71 is then in communication with the return conduit 78. The liquid in the cylinder 59 is then prevented from shifting to opposite sides of the piston because the conduits 73 and 77 are blocked by unapertured portions of the control valve 72.

The piston within the hydraulic cylinder 59 may be moved toward the forward end thereof by turning the control handle 75 to arrange the valve 72 in the position shown in Fig. 8 where liquid from the cylinder 59 exhausts through the hose 74 and conduit 73 and passes into the return pipe 78. The liquid under pressure from the supply pipe 71 then passes into the rear end of the cylinder 59 through the conduit 77 and the flexible tube 76. Accordingly, the piston rod 62 moves into the cylinder 59 to swing the auxiliary frame downwardly.

The invention includes means for locking the U-shaped frame in the horizontal position shown in Fig. 1 and this means includes a hook 81 mounted for pivotal movement on the chassis frame. The hook 81 is adapted to turn about the axis of a pin 82 secured in brackets 84 mounted on the chassis frame. The lower portion of the hook carries an arm 83 which depends below the pivot pin 82. When the auxiliary frame is in the locked position as shown in Fig. 3, the hook 81 is automatically turned to an unlatched position upon initial supply of liquid under pressure to the forward end of the cylinder 59 through the flexible tube 74. This advantageous function is accomplished by mounting the transverse shaft 61 for slight movement longitudinally of the chassis frame. In one embodiment as shown, the shaft 61 extends into bearings 86 mounted in the longitudinal beams 11 and 12 of the chassis frame. These bearings 86 are rigidly secured to the vehicle chassis and are each provided with a slot 85 as shown in Fig. 3. Thus, when liquid is supplied through the hose 74, the reaction force set up between the piston and the forward end of the cylinder 59 moves the shaft 61 forwardly relative to the truck frame. A bar 89 carried by the shaft 61 engages the arm 83 and turns the hook 81 in a clockwise direction in Fig. 3 about the pin 82 so as to release the detent from hooked engagement with the head or cross member 43 of the U-shaped auixliary frame. Accordingly, the auxiliary frame is free to turn about the axis of the stub shafts 38.

When the U-shaped frame is lowered by exhausting liquid through the hose 74, the piston is moved forwardly in the cylinder 59 and the auxiliary frame moves downwardly. The hook 81 is provided with a lug 91 which is engaged by the lower edge of the head or cross member 43 and accordingly swings the hook 81 to the latched position. If desired, a block 90 may be provided on the cross member 43 for being engaged by the hook 81. The hook is then in condition to be unlatched when liquid is supplied through the hose 74.

The invention includes means for preventing tipping of the vehicle chassis about the rear axle 17 when the hopper is being loaded and when it is desired to lift the hopper with a load therein from the position shown in Fig. 2. Such means may include a pair of idler wheels 101 and 102 mounted on the extended portions of the side beams 11 and 12 of the chassis frame rearwardly of the axle 17. These wheels 101 and 102 are preferably of such a diameter as to normally remain out of engagement with the surface on which the truck is supported. In the event of a tendency for the chassis frame to tip, these wheels 101 and 102 engage the ground and prevent a tendency of the truck frame to turn about the axle 17. The wheels 101 and 102 represent but one form of the means that may be employed for preventing a tendency of the front end of the truck to be lifted. The wheels 101 and 102 are resiliently mounted in brackets 100 and secured to the rear ends of the longitudinal beams of the chassis frame.

In operation of the truck, when it is desired to fill the body or hopper 26, the motor 56 is started to move the load-carrying body rearwardly from the dotted line position of Fig. 3 to a position somewhat as shown in Fig. 1. The control lever 75 is turned to the position shown in Fig. 3 to arrange the valve 72 in the position shown in Fig. 6. Liquid under pressure is then supplied to the hose 74 and at the forward end of the cylinder 59. The reactive force thereby set up causes the shaft 61 to move slightly forward in the slots 85. This movement will cause the bar 89 to engage the arm 83 and swing a latch 81 to a position to free the forward end of the U-shaped frame.

The piston moves rearwardly in the cylinder 59 and liquid exhausts from the cylinder through the tube 76 and the conduit 77 and into the return conduit 78. The shaft 63 being positioned forwardly of the stub shafts 38 will turn the U-shaped frame upwardly to a position such as shown in Fig. 2 whereby the rear wall 32 of the hopper will be substantially aligned with the ground. The truck may then be backed whereby the scoop-shaped hopper will engage under the pile of material, such as shown in Fig. 2. The control lever 75 may then be turned to position the valve 72 as shown in Fig. 8, whereby liquid will be supplied to the rear end of the cylinder 59 through the pipe 77 and the hose 76. The forward end of the cylinder then exhausts through the hose 74 and the pipe 73, the valve 72 and the return conduit 78. The U-shaped frame then swings downwardly whereby the granular material will slide down along the wall 32 onto the bottom wall 28 of the hopper. Then another bite of the load may be introduced into the hopper 26 by again turning the U-shaped frame to position the hopper as shown in Fig. 2 whereupon another rearward backing movement of the truck will permit additional material to enter the hopper. These bites may be repeated to substantially fill the hopper 26. During the loading of the hopper, the material may be shifted to the forward portion thereof by rapid forward driving of the truck and a sudden stopping whereby the inertia of the load will shift the same to the forward part of the hopper.

After the hopper has been filled, the load-carrying body may be moved forwardly on the auxiliary frame by energizing the motor 56 so as to turn the worm in such a direction as to move the hopper forwardly and to a position where the load will be more evenly distributed on the wheels of the vehicle. When the U-shaped auxiliary frame 34 moves downwardly towards the horizontal position, the lower edge of the cross member 43 engages the lug 91 of the hook 81 and turns this device in a counterclockwise direction about the axis of the pin 82. The hook 81 then engages over the block 90 and retains the auxiliary frame 34 in a locked condition during transportation of the vehicle. The control lever 75 may also be turned to the neutral position to arrange the valve 72 in the position shown in Fig. 7, whereby the liquid within the hydraulic cylinder is prevented from shifting through the conduit system and thereby maintains the piston therein in a fixed position. During normal traveling, the anti-tipping means, such as the wheels 101 and 102, do not normally engage the roadway or ground. It will be appreciated, however, that these wheels may be of such diameter as to normally assist in supporting the load carried by the vehicle and also serve as anti-tipping means. Furthermore, other means may be provided for preventing tipping of the vehicle during lifting of a load.

While the invention has been described with reference to specific structural details, it will be appreciated that a number of changes may be made in the various elements and the general organization. A number of modifications may be made, such as different power actuating elements for turning the auxiliary frame and for shifting the hopper-shaped body longitudinally thereon. Such modifications may be made without departing from the spirit and the scope of the invention as set forth in the appended claims.

I claim:

1. In a land vehicle, a chassis frame including side beams, an auxiliary frame including legs extending along the side beams of the chassis frame, means supporting the legs of said auxiliary frame for pivotal movement on said beams, means for swinging said auxiliary frame relative to the chassis frame, a scoop-shaped body mounted for longitudinal movement on said auxiliary frame, means carried by the auxiliary frame for shifting the body longitudinally of the auxiliary frame, said beams providing an unobstructed space therebetween at the rear portion of the chassis frame, and the legs of said auxiliary frame being so spaced that a portion of the auxiliary frame and the scoop-shaped body may move downwardly through said unobstructed space of the chassis frame.

2. In a land vehicle, a chassis frame including longitudinally extending side beams, a U-shaped auxiliary frame including legs extending along and above the side beams, means pivotally connecting the legs of said auxiliary frame to the chassis frame, means carried by the chassis frame for swinging said auxiliary frame relative to the chassis frame, a scoop-shaped body mounted for longitudinal movement on said auxiliary frame, means carried by the other end of the auxiliary frame for shifting the body longitudinally of the auxiliary frame, said beams providing an unobstructed space therebetween at the rear portion of the chassis frame, and the legs of said auxiliary frame being positioned inwardly of the side beams so that a rear portion of the auxiliary frame and a portion of the scoop-shaped body may swing downwardly into said unobstructed space of the chassis frame.

3. In a land vehicle, a chassis frame, a U-shaped auxiliary frame including legs, means pivotally supporting the legs of said auxiliary frame on the chassis frame, means for swinging said auxiliary frame relative to the chassis frame, a scoop-shaped body mounted for longitudinal movement on said legs, a motor carried by the auxiliary frame, a worm driven by said motor for shifting the body longitudinally of the auxiliary frame, said chassis frame including longitudinal beams wider than the legs of the auxiliary frame to provide an unobstructed space between the beams at the rear portion of the chassis frame, wheels arranged forwardly of the rear ends of said beams, and means depending from each of said beams at the rear end of each, normally not engaging a surface supporting said wheels, but adapted to engage said surface and arrest downwardly tilting movement of said chassis frame about the axis of said wheels.

4. In a self-loading dump truck, a chassis frame, an auxiliary frame mounted for pivotal movement on the chassis frame, normally engaging the auxiliary frame to prevent upward movement thereof, power-actuated means for moving the auxiliary frame upwardly with reference to the chassis frame, and means moved by initial operation of said power-actuated means to move said hook to an unlatched position.

5. In a self-loading dump truck, a chassis frame, an auxiliary frame mounted for pivotal movement on the chassis frame, a hook pivotally mounted on the chassis frame normally engaging the auxiliary frame to prevent upward movement thereof, a hydraulically operated cylinder and piston for moving the auxiliary frame upwardly with reference to the chassis frame, and means associated with the hook and said cylinder actuated by the reactive force set up upon initial supply of liquid under pressure to said cylinder for moving said hook to an unlatched position.

6. In a land vehicle, a chassis frame including longitudinally extending side beams, a U-shaped frame including a cross member and legs arranged along said side beams, pivots supporting the legs of the U-shaped frame on said chassis frame, a hook pivotally mounted on the chassis frame and normally engaging said cross member, a hydraulically operated cylinder, a lost motion connection between one end of the cylinder and said chassis frame, means associated with the cylinder for moving the U-shaped frame upwardly in response to the supply of liquid under pressure to the cylinder, and means operated by the movement of the cylinder on said lost motion connection for moving the hook to an unlatched position.

7. In a self-loading dump truck, a vehicle chassis frame including longitudinally extending side beams, driving wheels supporting said chassis frame, a hopper movably mounted relative to said chassis frame and adapted to be lowered between said side beams rearwardly of said driving wheels, and means fixed to each side beam rearwardly of the driving wheels for preventing tipping of the chassis frame when the hopper having a load therein is lifted and supported on the chassis frame.

8. In a self-loading dump truck, a vehicle chassis frame including longitudinally extending side beams, driving wheels supporting said chassis frame, a hopper movably mounted relative to said chassis frame and adapted to be lowered between the said side beams rearwardly of said driving wheels, and wheels carried by the side beams rearwardly of the driving wheels for preventing tipping of the chassis frame when the hopper having a load therein is being lifted and supported on the rear end of the chassis frame.

9. In a land vehicle, a chassis frame including longitudinally extending side beams, a U-shaped frame including a cross member and legs extending along said side beams, pivots supporting the legs of the U-shaped frame on said chassis frame, a scoop-shaped hopper mounted for movement longitudinally of the legs of the U-shaped frame, a motor mounted on the said cross member for moving said hopper relative to the U-shaped frame, a hydraulically operated cylinder, means associated with the cylinder for moving the U-shaped frame upwardly in response to the supply of liquid under pressure to the cylinder, said beams providing an unobstructed space therebetween at the rear portion of the chassis frame, the legs of said auxiliary frame being so spaced that a portion of the auxiliary frame and a portion of the scoop hopper may move downwardly through said space, load supporting wheels arranged forwardly of the rear ends of said beams, and an auxiliary wheel carried by the rear end portion of each beam normally out of engagement with the surface supporting said load supporting wheels but adapted to engage said surface and arrest downward tilting movement of the chassis frame about the axis of said load supporting wheels.

10. In a self-loading dump truck, a vehicle chassis frame including longitudinally arranged side beams having rigid rear portions with an unobstructed space therebetween, main wheels supporting the chassis frame, a hopper movably mounted relative to said chassis frame and adapted to be lowered through the unobstructed space between said side beams and rearwardly of said wheels, an auxiliary wheel secured to the rear portion of one beam, an auxiliary wheel secured to the rear portion of the other beam, and said auxiliary wheels preventing unrestrained tipping of the chassis frame about the axis of the main wheels when the hopper carries a load with the center of gravity thereof rearwardly of the axis of the main wheels.

WILLIS B. McLENDON.

REFERENCES CITED

The following references are of record in the file of this patent:

UNITED STATES PATENTS

| Number | Name | Date |
| --- | --- | --- |
| 1,153,369 | Bring | Sept. 14, 1915 |
| 1,268,598 | Moore | June 4, 1918 |
| 1,905,855 | Gross | Apr. 25, 1933 |
| 2,122,992 | Pride | July 5, 1938 |
| 2,251,435 | Anthony | Aug. 5, 1941 |
| 2,354,337 | Smith | July 25, 1944 |
| 2,413,661 | Stokes | Dec. 31, 1946 |
| 2,437,010 | Way | Mar. 2, 1948 |